(12) United States Patent
Bourque et al.

(10) Patent No.: US 10,295,208 B2
(45) Date of Patent: May 21, 2019

(54) ROOF VENT

(71) Applicant: SnowVentCo Limited, Foxboro (CA)

(72) Inventors: Antoine Bourque, Belleville (CA); Stephen Devan Mootoo, Belleville (CA)

(73) Assignee: SnowVentCo Limited, Foxboro (CA)

( * ) Notice: Subject to any disclaimer, the term of this patent is extended or adjusted under 35 U.S.C. 154(b) by 0 days.

(21) Appl. No.: 15/252,672

(22) Filed: Aug. 31, 2016

(65) Prior Publication Data

US 2017/0051930 A1 Feb. 23, 2017

Related U.S. Application Data

(63) Continuation of application No. 14/271,824, filed on May 7, 2014, now Pat. No. 9,457,304, which is a (Continued)

(51) Int. Cl.
*F24F 7/02* (2006.01)
*B01D 46/00* (2006.01)
(Continued)

(52) U.S. Cl.
CPC ............. *F24F 7/02* (2013.01); *B01D 46/00* (2013.01); *B01D 46/0004* (2013.01);
(Continued)

(58) Field of Classification Search
CPC ..... E04D 13/17; E04D 13/178; E04D 13/174; F24F 7/02; F24F 5/0035; F24F 12/006;
(Continued)

(56) References Cited

U.S. PATENT DOCUMENTS 2,019,213 A * 10/1935 Dahlman ............... B01D 46/12
55/480
2,628,551 A * 2/1953 Leigh .................... F24F 7/02
454/366
(Continued)

FOREIGN PATENT DOCUMENTS

CA 2764725 5/2013
JP 2007289868 A * 11/2007

*Primary Examiner* — Adriana Figueroa
(74) *Attorney, Agent, or Firm* — Grant Tisdall

(57) ABSTRACT

A roof vent for ventilating the roof of a building to the atmosphere. The roof vent includes a flange portion to lay against the roof, the flange portion having an opening to let air vent from the interior of the building (e.g. an attic). The roof vent can optionally include a collar portion extending from the flange portion and enclosing, at least in part, about a periphery of the opening and a cap dimensioned and configured to cover over the opening (including the hole in the roof) and optionally over the collar portion. The cap is configured to provide a passage (between the flange portion and the cap) through which air can pass between the atmosphere and the opening. The roof vent also includes a corrugated filter plate, e.g. partially enclosed by the cap, and interposed between the central opening and the passage, the corrugated filter plate having a pore size sufficient to permit air to pass through but inhibit the passage of snow particles, cinder particles and/or water droplets there-through.

11 Claims, 15 Drawing Sheets

Related U.S. Application Data continuation-in-part of application No. 13/290,182, filed on Nov. 7, 2011, now Pat. No. 10,018,368.

(51) Int. Cl.
*E04D 13/17* (2006.01)
*F24F 5/00* (2006.01)
*F24F 12/00* (2006.01)
*B01D 46/52* (2006.01)

(52) U.S. Cl.
CPC ........... *B01D 46/521* (2013.01); *E04D 13/17* (2013.01); *E04D 13/174* (2013.01); *E04D 13/178* (2013.01); *F24F 5/0035* (2013.01); *F24F 12/006* (2013.01); *B01D 2279/35* (2013.01); *Y02B 30/563* (2013.01)

(58) Field of Classification Search
CPC .. B01D 46/521; B01D 46/00; B01D 46/0004; B01D 2279/35; Y02B 30/563
USPC ..................... 52/199; 454/366–368
See application file for complete search history.

(56) References Cited

U.S. PATENT DOCUMENTS

| | | | |
|---|---|---|---|
| 2,989,145 A * | 6/1961 | Goodloe | B01D 39/12 29/896.62 |
| 3,183,822 A | 5/1965 | Stone et al. | |
| 3,238,862 A * | 3/1966 | Smith | F24F 7/02 454/366 |
| 3,302,554 A * | 2/1967 | Rousey | F24F 13/08 454/280 |
| 3,494,113 A * | 2/1970 | Kinney | B01D 46/0005 55/481 |
| 3,593,478 A * | 7/1971 | Mason | E04D 13/17 454/368 |
| 4,461,066 A * | 7/1984 | Peterson | B21D 53/00 29/455.1 |
| 4,572,059 A | 2/1986 | Ramsay | |
| 4,593,504 A * | 6/1986 | Bonnici | E04D 13/17 454/347 |
| 4,621,569 A | 11/1986 | Fioratti | |
| 4,817,506 A | 4/1989 | Cashman | |
| 5,005,328 A | 4/1991 | Holtgreve | |
| 5,022,314 A | 6/1991 | Waggoner | |
| 5,427,571 A | 6/1995 | Sells | |
| 5,505,852 A * | 4/1996 | van Rossen | B01D 46/10 210/493.3 |
| 5,564,876 A | 10/1996 | Muller et al. | |
| 5,603,657 A * | 2/1997 | Sells | E04D 13/174 454/359 |
| 5,704,834 A | 1/1998 | Sells | |
| 5,803,806 A | 9/1998 | Blessinger | |
| 5,960,595 A * | 10/1999 | McCorsley, III | B32B 3/30 156/210 |
| 5,989,303 A * | 11/1999 | Hodge | B01D 46/0032 55/486 |
| 6,155,008 A | 12/2000 | McKee | |
| 6,302,787 B1 * | 10/2001 | Graft, Jr. | F24F 7/02 454/358 |
| 6,308,473 B1 | 10/2001 | Auck | |
| 6,309,546 B1 | 10/2001 | Herrmann et al. | |
| 6,319,300 B1 * | 11/2001 | Chen | B01D 46/0001 55/385.3 |
| 6,450,882 B1 | 9/2002 | Morris et al. | |
| 6,558,251 B2 | 5/2003 | Sells | |
| 6,589,113 B2 | 7/2003 | Sells | |
| 6,623,354 B2 | 9/2003 | Morris et al. | |
| 6,767,281 B2 | 7/2004 | McKee | |
| 6,805,627 B2 * | 10/2004 | Marts | F24F 13/082 454/367 |
| 6,978,803 B2 | 12/2005 | Brown et al. | |
| 7,063,733 B2 * | 6/2006 | Mori | A61L 9/014 55/385.3 |
| 7,182,688 B2 * | 2/2007 | Coulton | F24F 7/02 454/365 |
| 7,191,564 B2 * | 3/2007 | Higginbotham | E04D 13/076 210/474 |
| D556,314 S * | 11/2007 | Daniels, II | D23/393 |
| 7,384,331 B2 * | 6/2008 | Coulton | F24F 7/02 454/365 |
| 7,485,034 B2 | 2/2009 | Sells | |
| 7,544,124 B2 | 6/2009 | Polston | |
| 7,708,625 B2 * | 5/2010 | Leseman | B63J 2/04 454/10 |
| 7,774,999 B2 | 8/2010 | McKee | |
| 7,780,510 B2 | 8/2010 | Polston | |
| 8,205,401 B2 | 6/2012 | Ward | |
| 8,209,923 B1 | 7/2012 | Rich | |
| 8,322,089 B2 | 12/2012 | Railkar et al. | |
| 2001/0049261 A1 | 12/2001 | McKee et al. | |
| 2005/0239392 A1 | 10/2005 | Sells | |
| 2006/0116069 A1 | 6/2006 | Urbanski et al. | |
| 2007/0256399 A1 * | 11/2007 | Yang | B01D 46/444 55/418 |
| 2008/0160903 A1 * | 7/2008 | Fontana | F24F 13/085 454/289 |
| 2008/0220714 A1 | 9/2008 | Caruso et al. | |
| 2009/0013620 A1 * | 1/2009 | West | E04D 13/1476 52/198 |
| 2010/0107550 A1 | 5/2010 | Toas et al. | |
| 2010/0162643 A1 | 7/2010 | Blomberg et al. | |
| 2010/0255770 A1 | 10/2010 | Blake et al. | |
| 2011/0201266 A1 | 8/2011 | Henderson | |
| 2014/0342658 A1 * | 11/2014 | Parkinson | F24F 7/02 454/367 |

\* cited by examiner

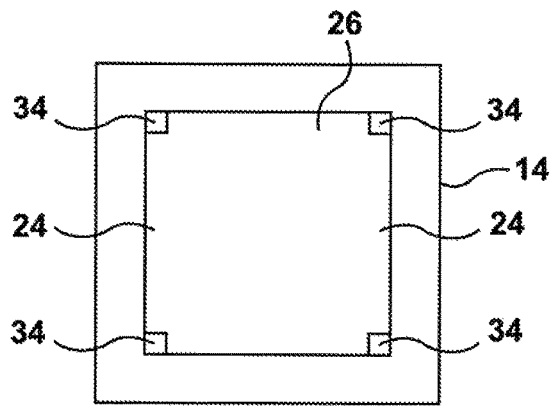
FIG. 4
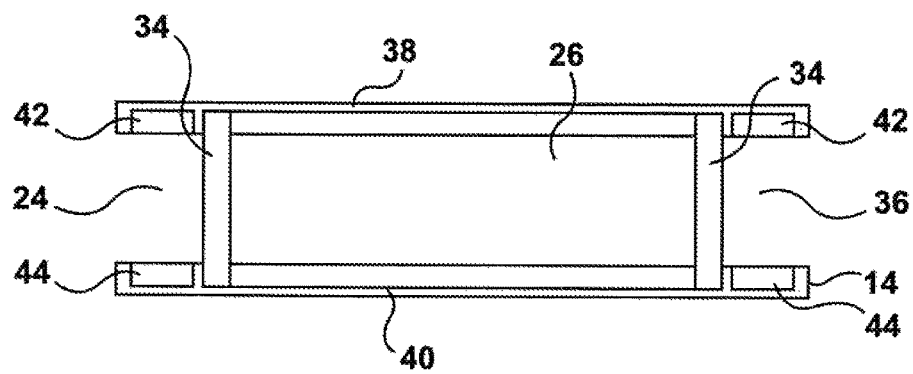
FIG. 5
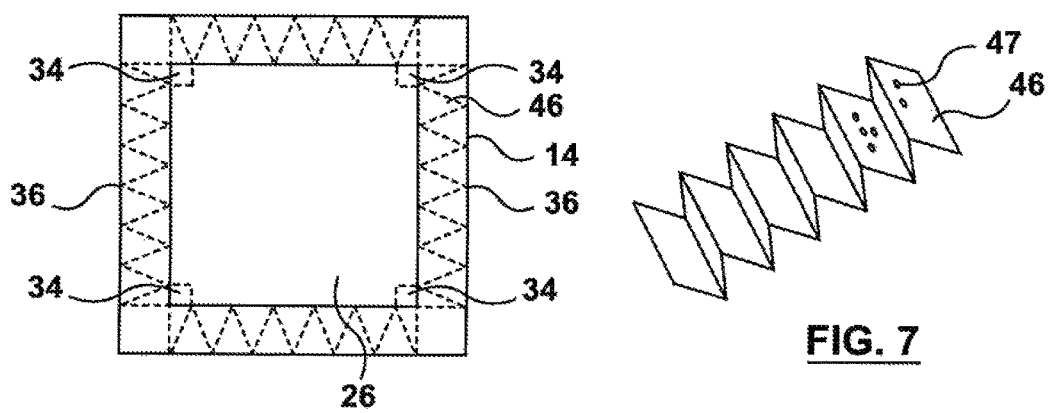
FIG. 6
FIG. 7

ROOF VENT

CROSS-REFERENCE TO RELATED APPLICATIONS

This application is a continuation of U.S. patent application Ser. No. 14/271,824 filed May 7, 2014, the contents of which are incorporated herein in their entirety, which is a continuation-in-part of application of U.S. patent application Ser. No. 13/290,182, filed Nov. 7, 2012, the contents of which are also incorporated herein in their entirety.

FIELD

This disclosure relates generally to roof vents for venting the roof of a building such as a house.

BACKGROUND

Roof vents provide the necessary ventilation to the roof of a house or other building, inhibiting condensation in the roof due to the infiltration or otherwise collection of moisture into the roof or attic cavity. Various roof vents employ vanes, grates and louvers to permit air to be channeled between the roof and the atmosphere, and to try to inhibit rain from entering the roof through the roof vent. A variety of caps and covers have been used to act as a guard to prevent the infiltration of rain. However, prior art roof vents have thus far been ineffective in inhibiting the infiltration of snow into the attic space, particularly in cases of snow storms and the like.

SUMMARY

It is an object of the present invention to provide a roof vent that obviates or mitigates at least some of the above-presented disadvantages in the art.

An improved roof vent which facilitates adequate attic ventilation but at the same time inhibits the infiltration of snow particles, water droplets, water runoff of the roof surface, burning cinders, and/or other undesirable elements from the atmosphere from gaining entry into the roof via the roof vent is desired.

A first aspect provided is a roof vent for ventilating a roof of a building via a hole in the roof to atmosphere, the roof vent comprising: a flange portion for resting on the roof, the flange portion having an opening for overlapping with the hole; a frame portion having sides extending upwardly from the flange portion about the opening, the frame portion for maintaining a cap in a spaced apart relationship with the flange portion; the cap connected to the frame portion and covering over the opening; and a corrugated filter plate extending between the cap and the flange portion and interposed transversely between the opening and the atmosphere, the corrugated filter plate providing for a passage of air between the atmosphere and the opening, the corrugated filter plate having a pore size sufficient for facilitating the air passage of air through the corrugated filter plate while blocking passage of atmospheric particles through the corrugated filter plate.

A second aspect provided is an insert for a roof vent for ventilating a roof of a building via a hole in the roof to atmosphere, the roof vent having a cap for connecting to a flange portion, the insert comprising: a flange portion for resting on the roof, the flange portion having an opening for overlapping with the hole; and a corrugated filter plate for extending between the cap and the flange portion and interposed transversely between the opening and the atmosphere, the corrugated filter plate providing for a passage of air between the atmosphere and the opening, the corrugated filter plate having a pore size sufficient for facilitating the air passage of air through the corrugated filter plate while blocking passage of atmospheric particles through the corrugated filter plate.

A third aspect provided is an insert for a roof vent for ventilating a roof of a building via a hole in the roof to atmosphere, the roof vent having a cap connected to a flange portion via a frame portion, the insert comprising: a base for resting on the flange portion, the base having an opening for overlapping with the hole; and a corrugated filter plate positioned on the base for extending between the cap and the flange portion and for being interposed transversely between the opening and the atmosphere, the corrugated filter plate providing for a passage of air between the atmosphere and the opening, the corrugated filter plate having a pore size sufficient for facilitating the air passage of air through the corrugated filter plate while blocking passage of atmospheric particles through the corrugated filter plate.

A fourth aspect provided is an insert for a roof vent for ventilating a roof of a building via a hole in the roof to atmosphere, the roof vent having a flange portion for connecting to a cap via a frame portion, the flange portion for resting on the roof and having an opening for overlapping with the hole, the insert comprising: a cap for connecting to the frame portion and covering over the opening; and a corrugated filter plate connected to the cap and for extending between the cap and the flange portion and for interposing transversely between the opening and the atmosphere, the corrugated filter plate providing for a passage of air between the atmosphere and the opening, the corrugated filter plate having a pore size sufficient for facilitating the air passage of air through the corrugated filter plate while blocking passage of atmospheric particles through the corrugated fitter plate.

A fifth aspect provided is a replacement cartridge for an existing roof vent for ventilating a roof of a building via a hole in the roof to atmosphere, the roof vent having a flange portion connected to a cap via a frame portion, the flange portion for resting on the roof and having an opening for overlapping with the hole, the replacement cartridge comprising: a corrugated filter plate for connecting with at least one of the flange portion, the cap or the frame portion, the corrugated filter plate for extending between the cap and the flange portion and for interposing transversely between the opening and the atmosphere, the corrugated filter plate providing for a passage of air between the atmosphere and the opening, the corrugated filter plate having a pore size sufficient for facilitating the air passage of air through the corrugated filter plate while blocking passage of atmospheric particles through the corrugated filter plate.

BRIEF DESCRIPTION OF THE DRAWINGS

The foregoing and other aspects will now be described by way of example only with reference to the attached drawings, in which:

FIG. 4 is a top view of an optional collar portion of the roof vent shown in FIG. 1;

FIG. 5 is a cross sectional view of the collar portion shown in FIG. 4;

FIG. 6 is a top view of the collar portion with a corrugated filter plate of the roof vent shown in FIG. 1;

FIG. 7 is a perspective view of a portion of the filter plate portion of the roof vent shown in FIG. 1;

In the drawings like characters of reference indicate corresponding parts in the different figures.

DETAILED DESCRIPTION

Figure 1:
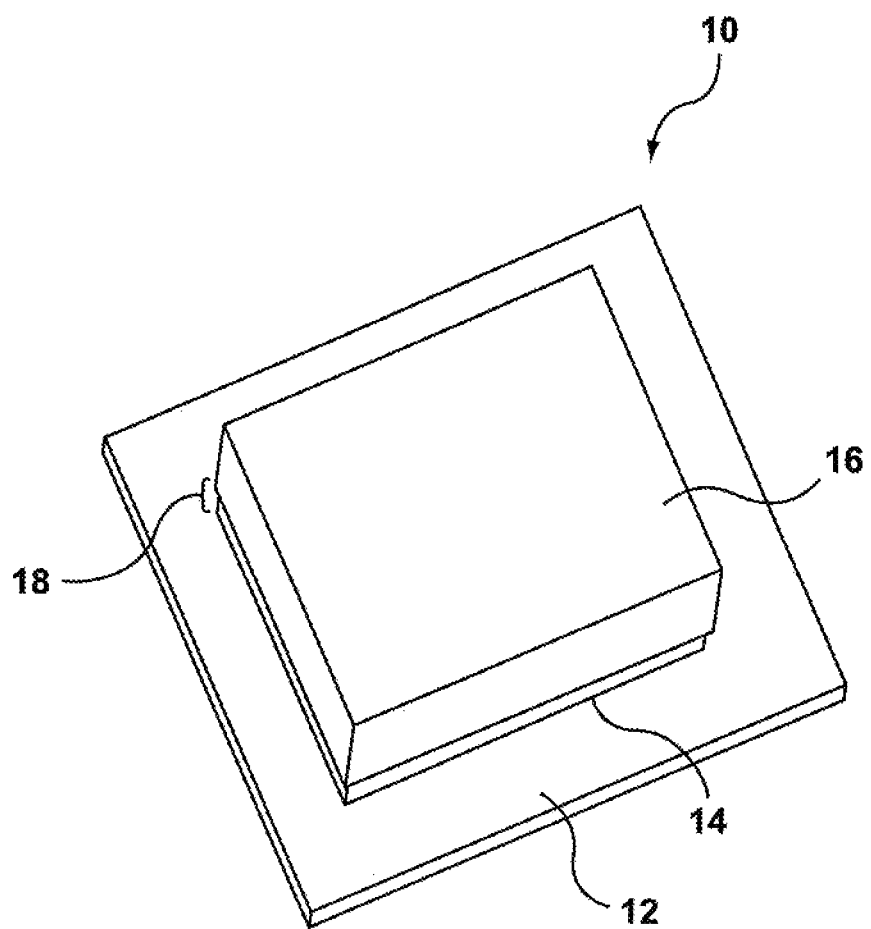
FIG. 1 is a perspective view of a roof vent.

FIG. 1,3 show a roof vent 10 for ventilating the roof of a building to the atmosphere. The roof vent 10 includes a flange portion 12 to lay against the roof, the flange portion 12 having an opening 22 to let air vent from the interior of the building (e.g. an attic). The roof vent 10 can optionally include a collar portion of the frame portion 14 extending from the flange portion 12 and enclosing, at least in part, about a periphery of the opening 22, and a cap 16 dimensioned and configured to cover over the opening 22 (including the hole 28 in the roof) and optionally over the collar portion of the frame portion 14. The cap 16 is configured to provide a passage (between the flange portion 12 and the cap 16) through which air can pass between the atmosphere and the opening 22. The roof vent 10 also includes a corrugated filter plate 46, e.g. partially enclosed by the cap 16, and interposed between the central opening 22 and the air passage (e.g. gap) between the cap 16 and the flange portion 12. The corrugated filter plate 46 can have a pore size 47 (e.g. perforations, holes, a plurality of apertures, etc.—see FIG. 7) sufficient to facilitate air to pass through the corrugated filter material 46 (e.g. from one side 19 of the corrugated filter material 46 to the other 19) but inhibit the passage of snow particles, cinder particles and/or water droplets there-through (e.g. from one side 19 of the corrugated filter material 46 to the other 19). In any event, it is recognized that the purpose of the corrugated filter material 46 is to provide for the flow through of air while inhibiting the passage of undesirable particles/droplets (e.g. solid and/or liquid pieces of matter) through the corrugated filter material 46 impinging from the atmosphere and into the interior of the roof via the opening 22 and adjacent hole 28

For example, the corrugated filter material 46 can be positioned as extending upwardly between the flange portion 12 and the cap 16 (covering the opening 22). It is recognized that the corrugated filter material 46 can be in contact with a top surface 13 of the flange portion 12, in contact with a underside surface 17 of the cap 16, and/or in contact with the top surface 13 of the flange portion 12 and with the underside surface 17 of the cap 16. It is recognized that a sidewall 15 (e.g. collar wall—see FIG. 2) extending upwardly from the top surface 13 of the flange portion 12 can also be considered as part of the top surface 13 of the flange portion 12. It is recognized that a sidewall (not shown) extending downwardly from the bottom/underside surface 17 of the cap 16 can also be considered as part of the bottom/underside surface 17 of the cap 16.

Corrugated (see FIG. 7) can refer to draws or bends into folds or alternate furrows and ridges of the surface of the filter plate 46. A corrugated surface can also refer to a pleated surface 19. A corrugated surface (e.g. side 19 and also referred to as pleated surface or single walled surface) can also refer to a shape into folds or parallel and alternating ridges and grooves. The juncture between the folds can be well defined (e.g. a crease line) or can be distributed over the surface (e.g. an arcuate change in direction from one fold to the next, such as an arcuate portion of the surface 19 of the corrugated filter material 46). For example, the corrugated filter material 46 (e.g. plate) can be a single walled surface 19 as shown, can be a double walled structure, not shown, (e.g. having a space between adjacent walls having a corrugated surface 19, etc). Preferably the corrugated filter material 46 has a corrugated surface 19 exposed to the passage of air impinging on the corrugated filter material 46 from the atmosphere and directed towards the opening 22 (and overlapping hole 28 in the roof membrane of the building) and into the roof cavity (e.g. attic space). Preferably the corrugated filter material 46 has a corrugated surface 19 exposed to the passage of air impinging on the corrugated filter material 46 from the exiting the roof cavity (e.g. attic space) and directed towards the opening 22 (and overlapping hole 28 in the roof membrane 50 of the building) and into the atmosphere.

In terms of positioning of the corrugated filter material 46 with respect to the cap 16 (at least covering the opening 28) and with respect to the flange portion 12, the corrugated filter material 46 is positioned transverse to both of the cap 16 (e.g. underside surface 17 of the cap 16) and the flange portion 12 (e.g. upper surface 13 of the flange portion 12). As such, it is recognized that the corrugated filter material 46 can be in contact with one of the surfaces 13,17, with both of the surfaces 13, 17, an/or in contact with none of the surfaces 13,17 (e.g. suspended between the surfaces 13,17 by a secondary structure that can also be used to position the cap 16 in a spaced apart relationship with the flange portion 12. For example, the secondary structure can be provided by the collar portion of the frame portion 14 described herein as an example only. In any event, the corrugated filter material 46 extends transversely (in whole, in part, etc.) between the cap 16 and the flange portion 12 (e.g. base of the roof vent 10). In terms of in-whole, then any passage of air between the opening 22 and the atmosphere would pass though the body of the corrugated filter material 46. Alternatively, in terms of in- part, some of the passage of air between the opening 22 and the atmosphere would pass though the body of the corrugated filter material 46 and passage of air between the opening 22 and the atmosphere would go around the body of the corrugated filter material 46. In terms of transverse, this can be referred to as situated or lying across (e.g. between the opposing surfaces 13,17), lying sideways (e.g. between the opposing surfaces 13,17), crosswise (e.g. between the opposing surfaces 13,17), crossing from side to side (e.g. between the opposing surfaces 13,17), athwart (e.g. between the opposing surfaces 13,17), crossways (e.g. between the opposing surfaces 13,17), lying or extending across or in a cross direction (e.g. between the opposing surfaces 13,17), cross (e.g. between the opposing surfaces 13,17). One example of transverse (e.g. between the opposing surfaces 13,17) can be lying at right angles to or perpendicular to each or both of the opposing surfaces 13,17). It is also recognized that the angle of the corrugated filter material 46, when extending away from (either in or out of contact with the actual surface 13,17) the surface 13,17, can be other than 90 degrees, as desired.

The roof vent 10 can be considered as a roof vent type for natural ventilation, as using the process of supplying and removing air through an indoor space (e.g. attic) without using mechanical systems. Natural ventilation implemented by the roof vent 10 can refer to the flow of external air to an indoor space as a result of pressure or temperature differences. There can be two types of natural ventilation occurring in buildings: wind driven ventilation and buoyancy-driven ventilation. While wind can be the main mechanism of wind driven ventilation, buoyancy-driven ventilation can occur as a result of the directional buoyancy force that results from temperature differences between the interior and exterior of the building. Alternatively, natural ventilation can be referred to as Passive ventilation, as a way to provide attic ventilation for shingle roof assemblies is by nonpowered, passive ventilation based roof vent 10. This method relies primarily on natural air convection—the upward movement of heated air because of its lower density—but may also take advantage of wind-generated pressure differences.

Natural convection can initiate the upward flow of air through an attic and through the roof vent 10. This air current can be maintained to aid in continuous circulation of air through the attic if intake vents placed low in the attic make colder air available to replace the heated air exhausted through vents placed high in the attic. Convection-assisted ventilation can be effective when approximately equal amounts of ventilation opening areas are placed at the soffits or eave and at or near the top of the attic space, referred to as "balanced ventilation." It is also recognized that the roof vent 10 can be a powered type roof vent rather than a passive type. For example, the roof vent 10 can have a powered unit, e.g. a fan with corresponding drive mechanism (e.g. motor) for assisting flow of the passage of air through the corrugated filter plate 46.

In terms of the net free cross sectional area for the passage of air through the corrugated filter plate 46, the aggregate total open area (e.g. summation of the effective open area of each of the individual pore 47 cross sectional areas) of the plurality of holes/pores 47 can be configured to satisfy a minimum net open area threshold. For example, the open area threshold can be approximately 50 square inches of flow ability (e.g. net free area) available for the passage of air to flow through. It is recognized that the minimum net open area threshold can be a standard defined threshold, different for each country, province, and/or state based building codes/standards. In an example where the corrugated filter plate 46 does not extend from surface 13 to surface 17, the total net free air flow area available would be the aggregate of the effective open area of each of the individual pore 47 cross sectional areas of the corrugated filter plate 46 and the open cross sectional area of an air gap between an end of the filter plate 46 and the adjacent surface 13,17.

Referring to FIG. 1,3, the roof vent 10 provides for roof ventilation while at the same time inhibiting the infiltration of snow (e.g. undesired particles) into the attic. The roof vent 10 has the flange portion 12, optionally the collar portion of the frame portion 14 (shown as an example embodiment) and the cap 16 configured to cover over (e.g. most) of the collar portion of the frame portion 14 and to cover over a portion of the surface 19. Flange portion 12 is preferably flat to rest flush with the roof (not shown) to make it easy to install the roof vent. Collar portion of the frame portion 14 extends perpendicularly upward from flange 12. Cap 16 is dimensioned to enclose much of the collar portion of the frame portion 14 but to leave a space gap 18 between the cap 16 and flange portion 12 to permit atmospheric air to pass through collar portion of the frame portion 14.

Figure 2:
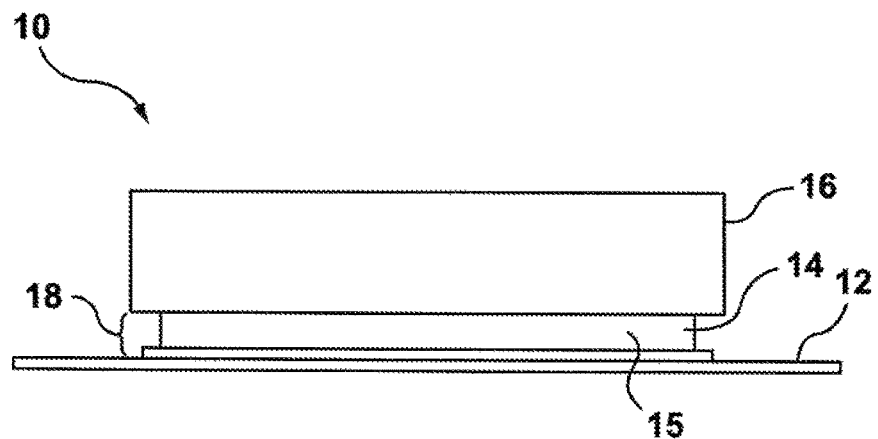
FIG. 2 is a side view of the roof vent shown in FIG. 1.
Figure 3:
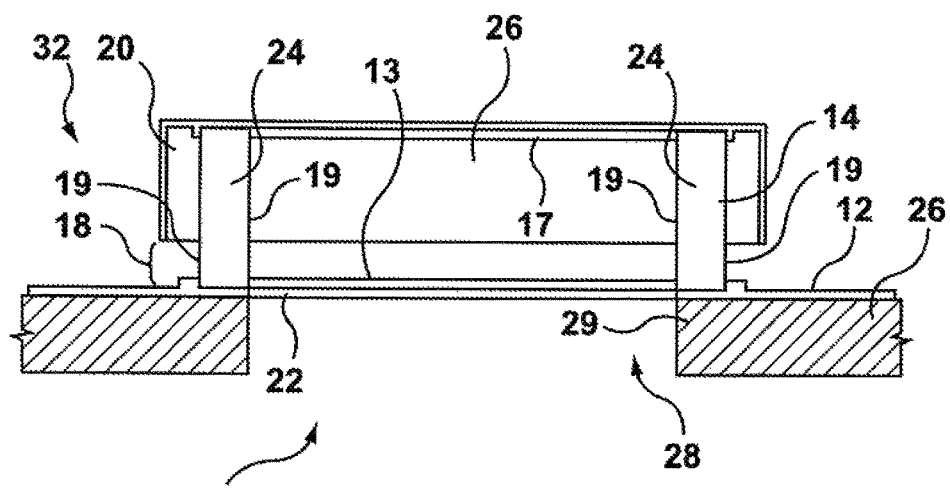
FIG. 3 is a cross sectional view of the roof vent shown in FIG. 2.

Referring now to FIGS. 2 and 3, flange portion 12 has a (e.g. central) aperture 22 and collar portion of the frame portion 14 has a (e.g. central) cavity 26 which communicates with aperture 22 providing for air to circulate between attic interior 30, through hole 28 in roof 26 and cavity 26. Collar of the frame portion 14 can have one or more apertures 24 through which air can circulate between cavity 26 and outside atmosphere 32 through air passage 20 and a gap 18 (between the flange portion 12 and the cap 16). As can be seen in FIGS. 4 and 5, collar portion of the frame portion 14 can be formed as a (e.g. annular) frame having upper portion 38, lower portion 40 and sides 36 formed from support members 34. Apertures 24 are formed between support members 34. The collar portion of the frame portion 14 is one example of a frame (e.g. frame portion 14) that can provide for structural rigidity between the cap 16 and flange portion 12, thus providing for structural integrity of the roof vent 10 in keeping the cap 16 at a spaced apart distance from the flange portion 12. It is also recognized that the frame portion 14 can be separate from the corrugated filter material 46 (e.g. the frame portion 14 and the corrugated filter material 46 are separate and distinct pieces of the roof vent 10). It is also recognized that the frame portion 14 can be integrated with the corrugated filter material 46 (e.g. the frame portion 14 and the corrugated filter material 46 are an integrated component of the roof vent 10). For example, the frame portion 14 with integrated corrugated filter material 46 can be attached to both the cap 16 and the flange portion 12, such that the frame portion 14 extends away (e.g. upwardly, downwardly, etc.) from the respective surfaces 13,17.

Referring again to FIG. 3, the cavity 26 can form a continuous opening between upper and lower portions 38 and 40, respectively. Upper and lower portions 38 and 40 can have channels 42 and 44, respectively which are opposed (e.g. parallel) to each other and which are dimensioned and configured to receive side edges of corrugated filter plate 46 so that the corrugated filter plate 46 is positioned transversely between interior 26 and aperture 24. Therefore, air passing from the aperture 24 can pass through corrugated filter plate 46 to enter cavity 26. Alternately, the corrugated filter plate 46 is positioned transversely between the atmosphere and the aperture 24.

The corrugated filter plate 46 can be a wire mesh which is corrugated to increase its surface area, thus providing for the passage of air through the surface 19 at a multiple of angles relating to the different surfaces of the folds that are angles to one another. As such, the corrugated surface 19 has a greater surface area as compared to a corresponding planar surface of a side of the roof vent 10 (e.g. a planar cross sectional area of a bounded surface measured between an adjacent pair of support members 34 and the adjacent and opposing surfaces 13,17). The corrugated filter plate 46 can have a pore 47 size which is selected to inhibit the passage of atmospheric particles (e.g. snow particles) through the corrugated filter plate 46, while facilitating the flow of air through the corrugated filter plate 46 from side 19 to side 19. For example, a pore size of approximately 120 microns can inhibit the passage of snow while providing for adequate air circulation through the corrugated surface of the filter plate 46, as compared to the planar surface area of a non-corrugated cross sectional area of a side of the roof vent 10 (e.g. covered by a fibrous layer that is non-corrugated—e.g. planar). The material of the corrugated filter plate 46 can be composed of metal, such as but not limited to stainless steel, aluminum, or other materials that can inhibit attachment of the particles (e.g. snow) to the corrugated surface 19, when the surface 19 is in an extending orientation (e.g. upwardly, away from, towards, etc.) with respect to the surface(s) 13,17.

Referring back to FIG. 3, collar of the frame portion 14 can extend transverse (e.g. perpendicular) to opening 22. Cap 16 can be dimensioned to close off opening 22 from precipitation and other particles from entering the opening 22 from above. An air passage 20 can be formed between cap 16 and collar portion of the frame portion 14 so that air flows through the side walls of collar of the frame portion 14 and air passage 20 and out gap 18. As mentioned above, collar portion of the frame portion 14 can have the corrugated filter plate 46 (see FIG. 6) mounted thereto so that air flowing from outside vent 10 passes (at least in part) through the corrugated surface 19 of the filter plate 46 before entering opening 22, hole 28 and attic interior 30. Any wind driven snow can be trapped between collar of the frame portion 14 and cap 16 and thus be inhibited from infiltrating the attic space 30. Since air passage 20 can be larger than gap 18, a quantity of snow can accumulate on the outside of collar of the frame portion 14 while at the same time be inhibited from blocking off the flow of air between exterior 32 (e.g. atmosphere) and attic interior 30. As mentioned previously, the corrugation of filter plate 46 (see FIG. 7) provides for a larger surface area, that what could be achieve by a planar porous layer, positioned about the opening 22, thereby increasing the amount of filter media available to permit air to flow through the filter plate 46. It is recognized that the corrugated filter plate 46 can be of any peripheral shape (e.g. about the periphery 29 of the hole 28), for example square as shown in FIG. 6, as well as any other shape as desired (e.g. circular, oblong, triangular, rectangular, pentagonal), as well as any number of sides (e.g. a square has 4 sides, a triangle has three sides, etc.), as well as any side shape (e.g. linear, arcuate, etc.).

It will be appreciated that numerous modifications can be made to invention without departing from the core of the invention. In particular, the corrugated filter plate 46 can be laid out within the collar portion of the frame portion 14 so that the filter plate 46 lies parallel to opening 22 (e.g. overlapping the opening 22). Certain advantages have been found to a transverse (e.g. perpendicular) arrangement between the filter plate 46 and opening 22 (see FIG. 3). In particular, it is recognized that a perpendicular arrangement can provide for appropriate air circulation through the roof vent 10 while improving the roof vent's 10 ability to block wind driven snow from passing through the filter plate 46. In some applications, it can be more cost effective to produce a roof vent 10 where the filter plate is laid out parallel (or some other angle other than perpendicular) relative to the central opening 22.

Figure 8:
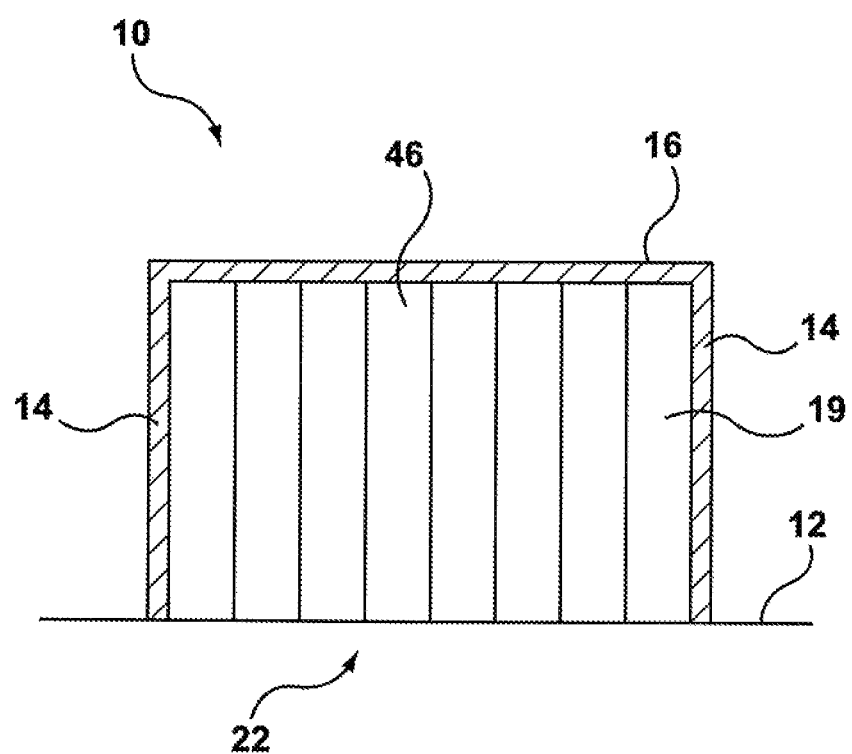
FIG. 8 is an alternative embodiment the cross sectional view of the roof vent shown in FIG. 3.

In view of the above, referring to FIG. 8, shown is an alternative embodiment of the roof vent 10 having a cap 16 (covering opening 22) positioned in a spaced apart relationship with the flange portion 12 by an intervening frame portion 14 (integrated with the filter plate 46, separate from the filter plate 46, etc.), and the corrugated filter plate 46. In this example, the cap 16 does not overlap or otherwise cover the corrugated surface 19 of the filter plate 46, as is shown in FIG. 3. It is recognized that in FIG. 8, a collar sidewall is not shown. As such, it is considered that the collar sidewall (s) can be separate from and thus added to the configuration of a roof vent 10 combination of cap 16, flange portion 12 and corrugated filter plate 46, as desired. For example, the corrugated filter plate 46 can be positioned as a retrofit (e.g. optional insert module to an off-the shelf roofing accessory) into an existing cap 16, frame 14 (e.g. collar portion with or without sidewalls extending from a flange), and flange configured roof vent 10. For example, the flange portion 12 (e.g. with groove) and associated corrugated filter material 46 can be sold as an insert to be combined with an existing cap 16 and/or flange combination roof vent 10.

Figure 9:
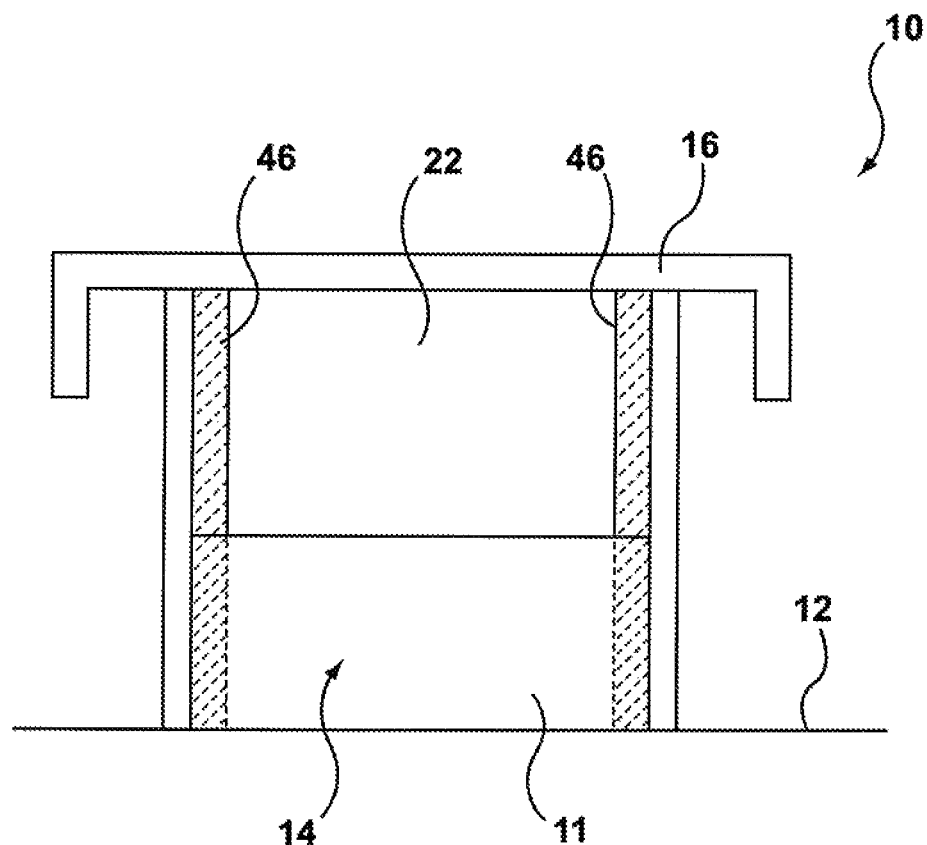
FIG. 9 is a further alternative embodiment the cross sectional view of the roof vent shown in FIG. 3.

Referring to FIG. 9, shown is an alternative embodiment of the roof vent 10 having a cap 16, frame portion 14 including collar sidewalls 11, the flange portion 12, and the corrugated filter material 46 extending between the cap 16 and the flange portion 12, such that the corrugated filter material 46 is positioned between the aperture 24 and the opening 22 (see FIG. 3).

Figure 10:
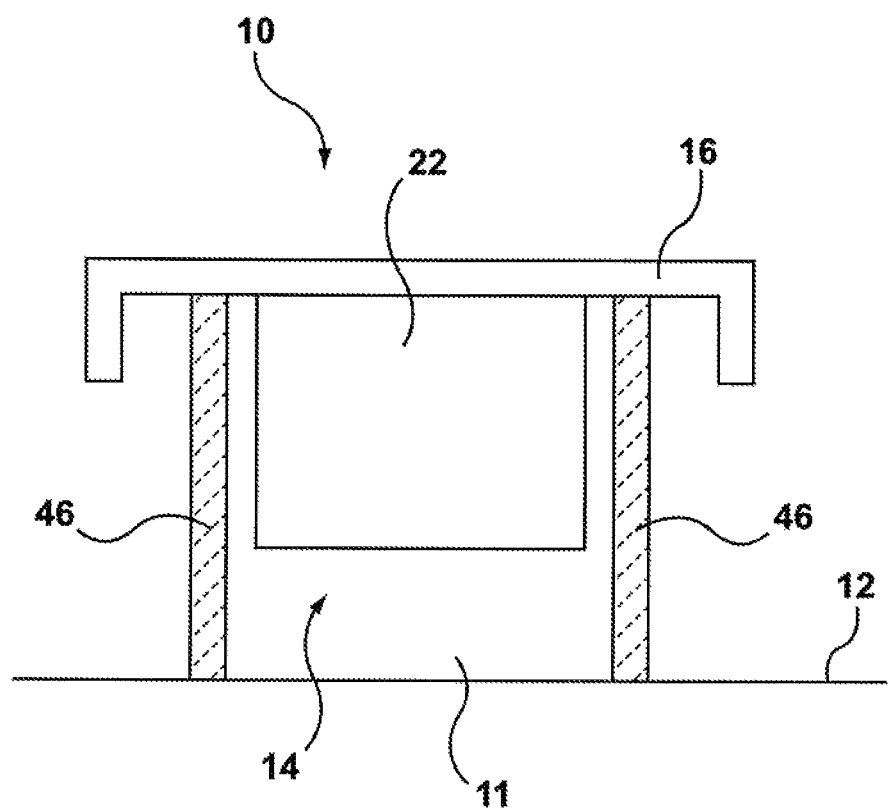
FIG. 10 is a further alternative embodiment the cross sectional view of the roof vent shown in FIG. 3.

Referring to FIG. 10, shown is an alternative embodiment of the roof vent 10 having a cap 16, frame portion 14 including collar sidewalls 11, the flange portion 12, and the corrugated filter material 46 extending between the cap 16 and the flange portion 12, such that the corrugated filter material 46 is positioned between the aperture 24 and the atmosphere.

Figure 11A:
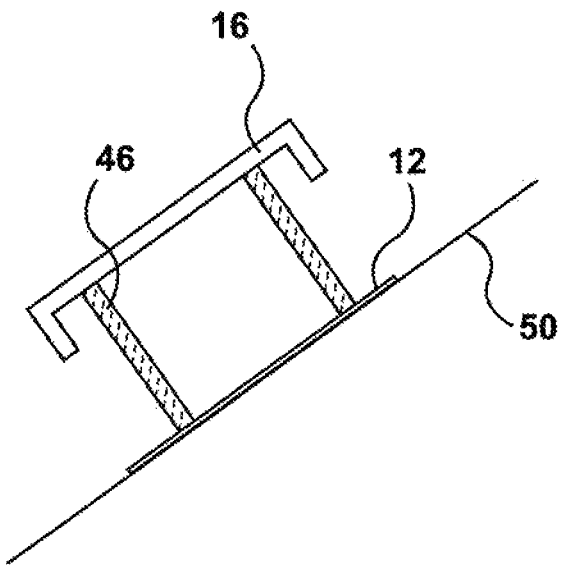
FIG. 11a is an alternative embodiment of the roof vent shown in FIG. 1.
Figure 11B:
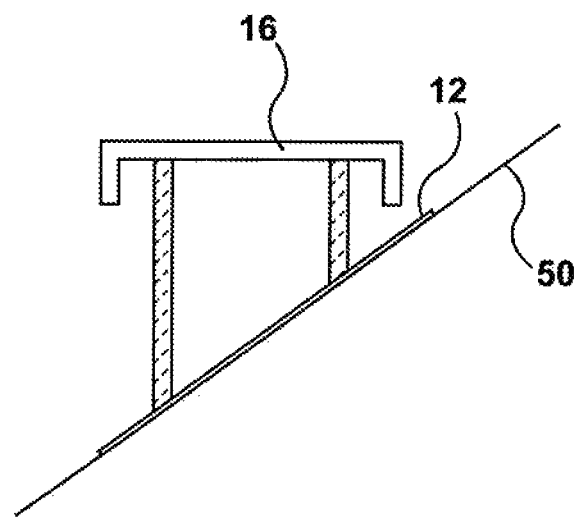
FIG. 11b is an alternative embodiment of the roof vent shown in FIG. 1.

Referring to FIG. 11a, shown is an alternative embodiment of the roof vent 10 having a cap 16, a flange portion 12, and a corrugated filter material 46 there between, such that the roof vent 10 is positioned non-vertically with respect to a sloped roof surface 50. Referring to FIG. 11b, shown is an alternative embodiment of the roof vent 10 having a cap 16, a flange portion 12, and a corrugated filter material 46 there between, such that the roof vent 10 is positioned vertically with respect to a sloped roof surface 50.

Figure 12:
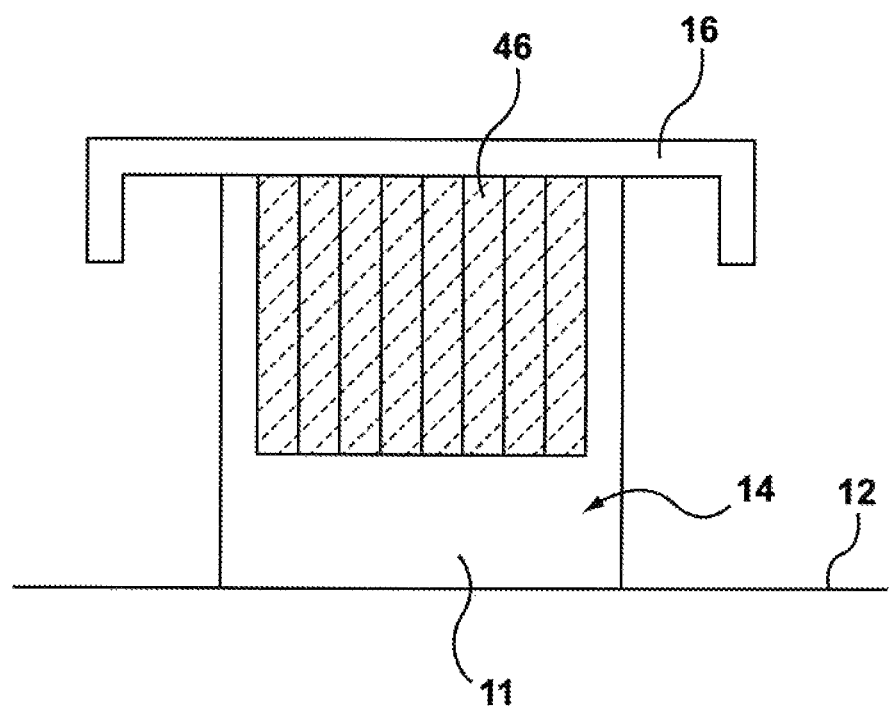
FIG. 12 is a further alternative embodiment the cross sectional view of the roof vent shown in FIG. 3.

Referring to FIG. 12, shown is an alternative embodiment of the roof vent 10 having a cap 16, frame portion 14 including optional collar sidewalls 11, the flange portion 12, and the corrugated filter material 46 extending between the cap 12 and the flange portion 12, wherein the collar sidewalls 11 are positioned between a bottom end of the corrugated filter material 46 and the flange portion 12.

Figure 13:
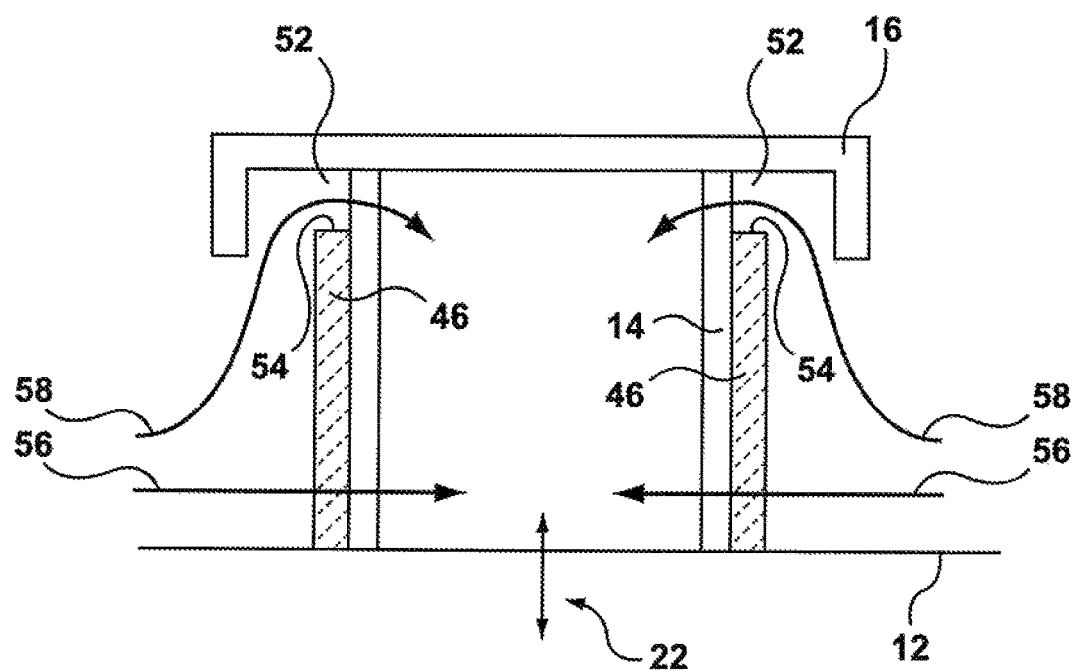
FIG. 13 is a further alternative embodiment the cross sectional view of the roof vent shown in FIG. 3.

Referring to FIG. 13, shown is an alternative embodiment of the roof vent 10 having a cap 16, frame portion 14, the flange portion 12, and the corrugated filter material 46 extending between the cap 12 and the flange portion 12, such that an air gap 52 is positioned between a top 54 (adjacent and spaced apart from surface 17) of the corrugated filter material 46, thus providing for air exchange with the interior via opening 22 both as air passing through 56 the corrugated filter material 46 and bypassing 58 the corrugated filter material 46 by flowing around the top 54 of the corrugated filter material 46 and through the air gap 52.

Figure 14:
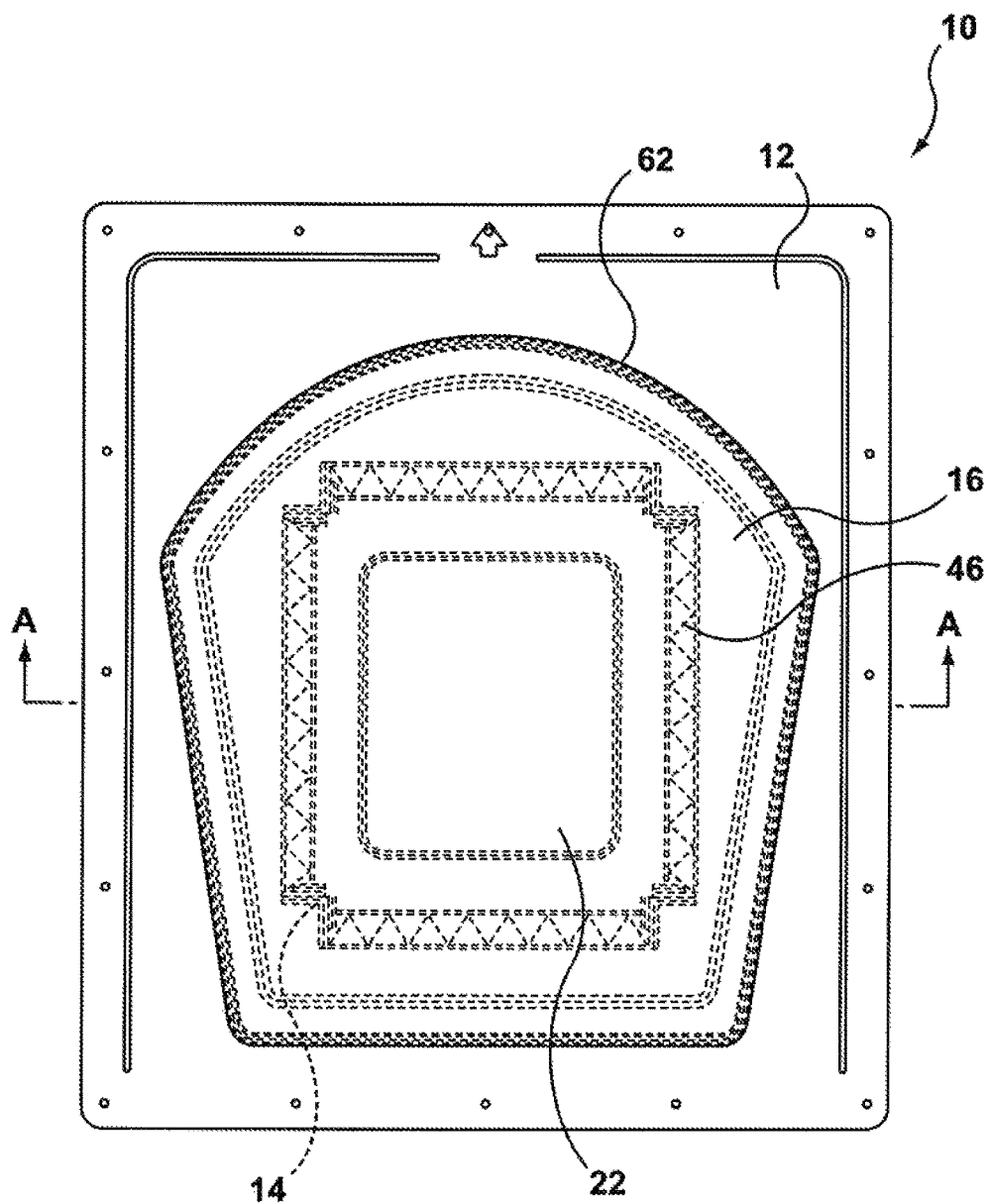
FIG. 14 is an alternative embodiment of the roof vent shown in FIG. 4.
Figure 15:
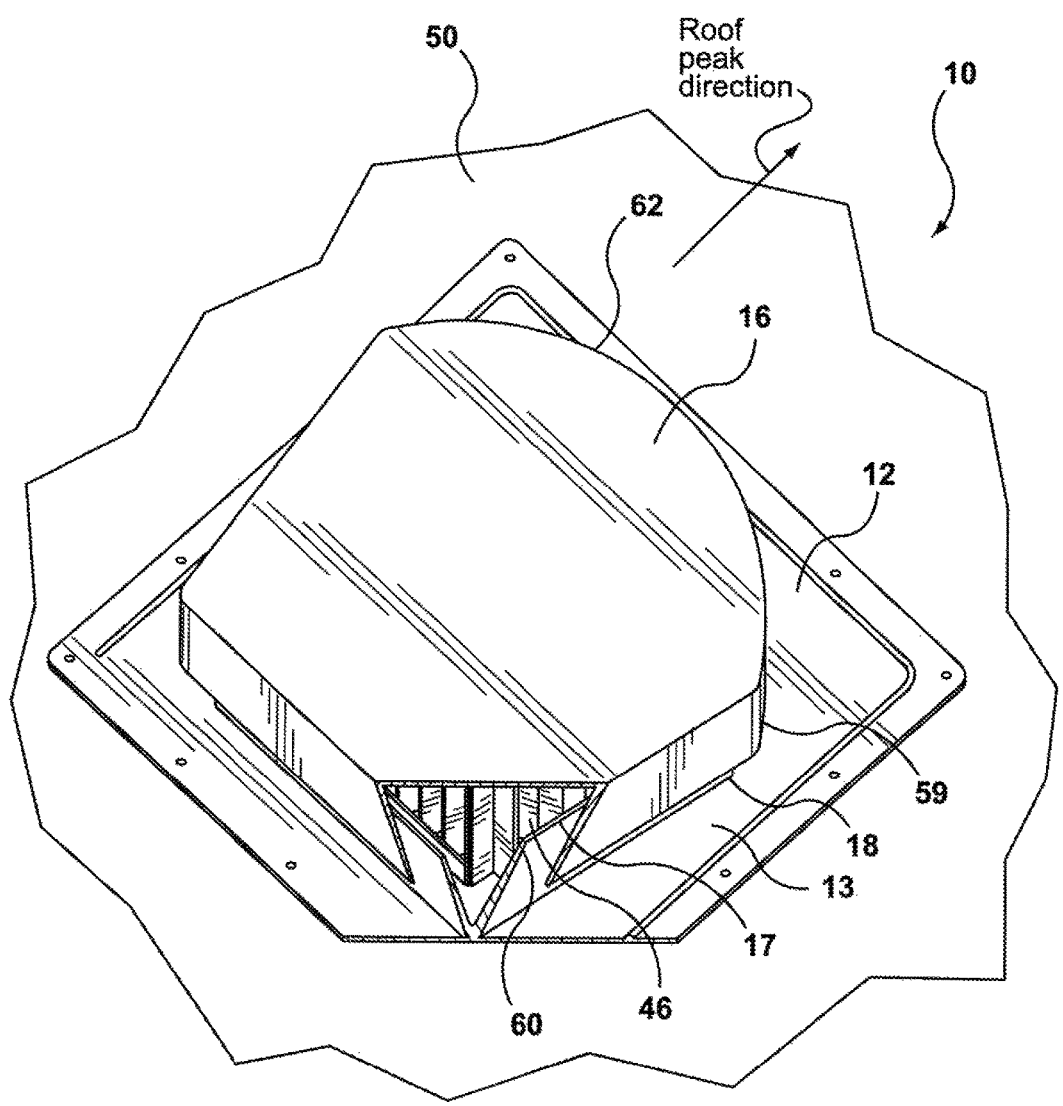
FIG. 15 is a perspective view of the roof vent shown in FIG. 14 with cap attached.
Figure 16:
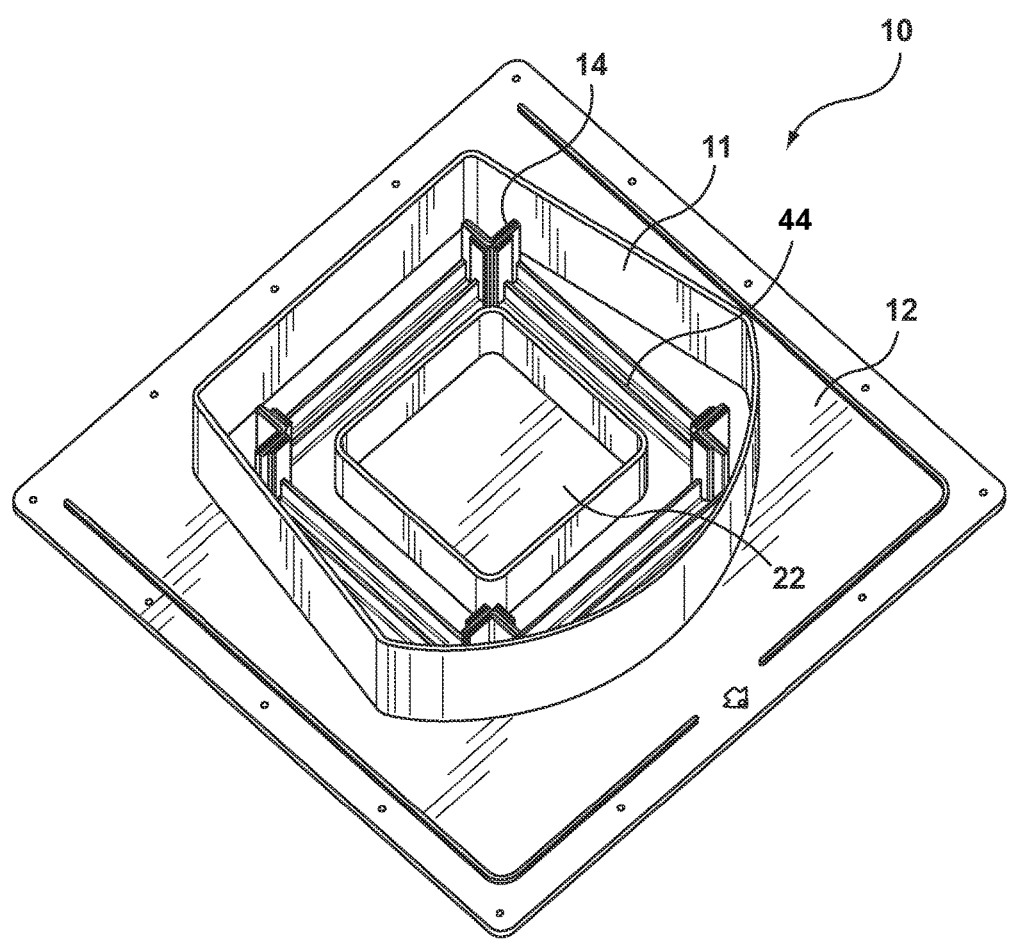
FIG. 16 is a perspective view of the roof vent shown in FIG. 14 without cap attached.

Referring to FIGS. 14, 15, 16 shown is an alternative embodiment of the roof vent 10 as an arch top roof vent having the flange portion 12 (base), an optional collar portion of the frame portion 14 (extends from base including sidewall 11) which also could be referred to as the frame portion 14, and the cap (hood) 16 configured to cover over the corrugated filter material 46. Flange portion 12 is preferably flat to rest flush with the roof 50 to make it easy to install the roof vent 10. Collar portion of the frame portion 14 extends away/upward from flange portion 12. The cap 16 can be dimensioned to enclose much of the collar of the frame portion 14 but to leave a qap 18 between the cap 16 and flange portion 12 to facilitate atmospheric air to pass through the corrugated filter material 46

The flange portion 12 has an aperture 22 and the collar portion of the frame portion 14 has the cavity which provides for air to circulate into the attic interior via the hole in the roof 50 and cavity of the collar portion of the frame portion 14. The collar portion of the frame portion 14 facilitates the air to circulate between the cavity and the outside atmosphere through the air passage and gap 18. The frame portion 14 can provide support members (illustrated at the four corners) that support the cap 16 above the flange portion 12 and provide clearance between a bottom surface of the cap 16 (e.g. cap arms 59 as an extension of the surface 17) and upper edge 60 (e.g. opposite the flange portion surface 13) of the collar portion of the frame portion 14

Corrugated filter plates 46 can be positioned between the support members of the frame portionl4. The corrugated filter plate 46 is positioned transversely between interior 22 and atmosphere. Therefore, air passing from atmosphere can pass through filter plate 46 to enter cavity 22. Preferably, a channel 44 can be formed in the flange portion 12 for receiving the filter plate 46.

Illustrated is an arch top design for the optional collar portion walls 11. The cap 16 can be similarly shaped to conform to the collar walls 11 shape to maintain a similarly sized air gap all around the collar portion walls 11. The top edge 62 of the cap 16 (labeled "up" in the drawings) is arcuate (i.e. non-linear) to provide for snow and rain to move away from the top edge 62 to help limit accumulation of the show and/or water as encountered based on the season. The shape of the collar portion wall 11 perimeter can vary but preferably, the top edge can have a curve or arcuate shape to limit accumulation of snow or rain. The perimeter of cap 16 shown in the drawings is trapezoidal but other shapes can include square or diamond so long as the top edge is arcuately shaped.

Figure 17:
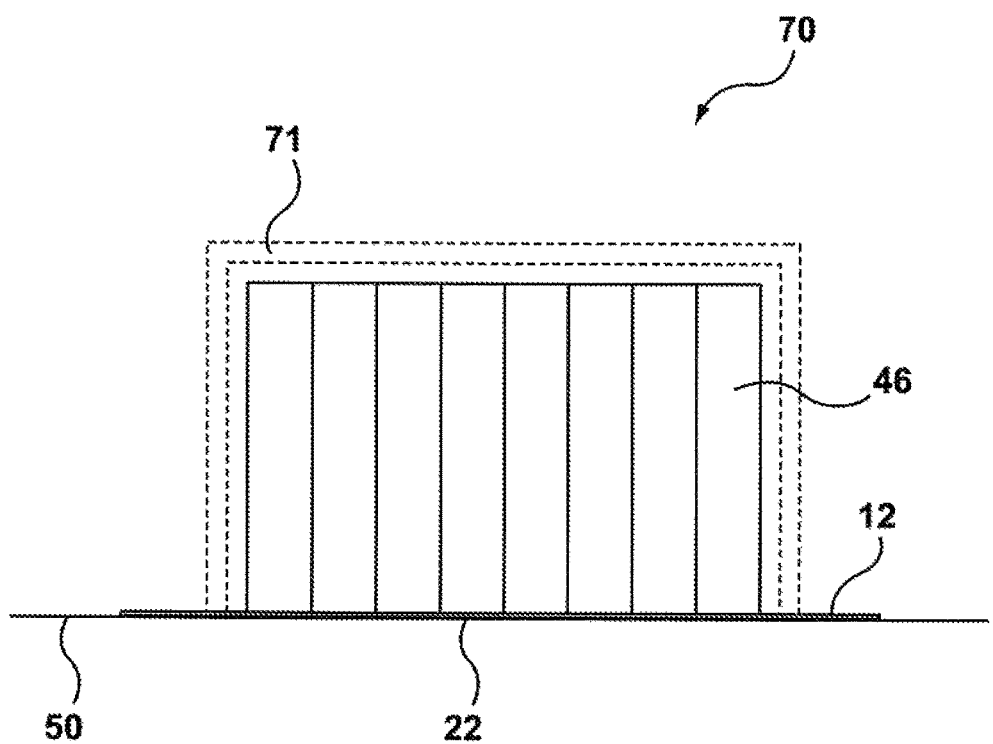
FIG. 17 is an insert as an alternative embodiment of the roof vent shown in FIG. 1.

Referring to FIG. 17 is an insert 70 for an existing roof vent 71 for ventilating a roof of a building via a hole in the roof to atmosphere, the existing roof vent 71 having a cap (shown in ghosted view) for connecting to a flange portion 12, the insert 70 comprising: the flange portion 12 for resting on the roof 50, the flange portion 12 having an opening 22 for overlapping with the hole; and the corrugated filter plate 46 for extending between the cap and the flange portion 12 and interposed transversely between the opening 22 and the atmosphere, the corrugated filter plate 46 providing for a passage of air between the atmosphere and the opening 22, the corrugated filter plate 46 having a pore size sufficient for facilitating the air passage of air through the corrugated filter plate 46 while blocking passage of atmospheric particles through the corrugated filter plate 46.

Figure 18:
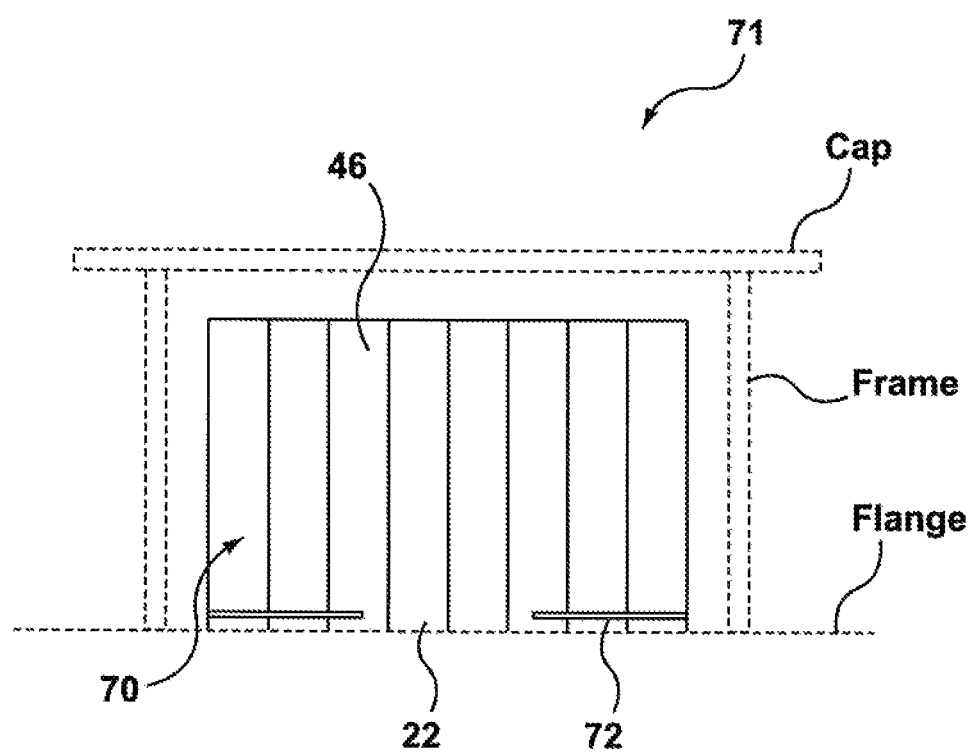
FIG. 18 is an alternative embodiment of the insert of FIG. 17.

Referring to FIG. 18 is an alternative embodiment of the insert 70 for the existing roof vent 71 for ventilating a roof of a building via a hole in the roof to atmosphere, the existing roof vent 71 having a cap connected to a flange portion via a frame portion (shown in ghosted view), the insert 70 comprising: a base 72 for resting on the flange portion, the base having an opening 74 for overlapping with the hole; and a corrugated filter plate 46 positioned on the base 72 for extending between the cap and the flange portion and for being interposed transversely between the opening and the atmosphere, the corrugated filter plate 46 providing for a passage of air between the atmosphere and the opening, the corrugated filter plate 46 having a pore size sufficient for facilitating the air passage of air through the corrugated filter plate 46 while blocking passage of atmospheric particles through the corrugated filter plate 46.

Figure 19:
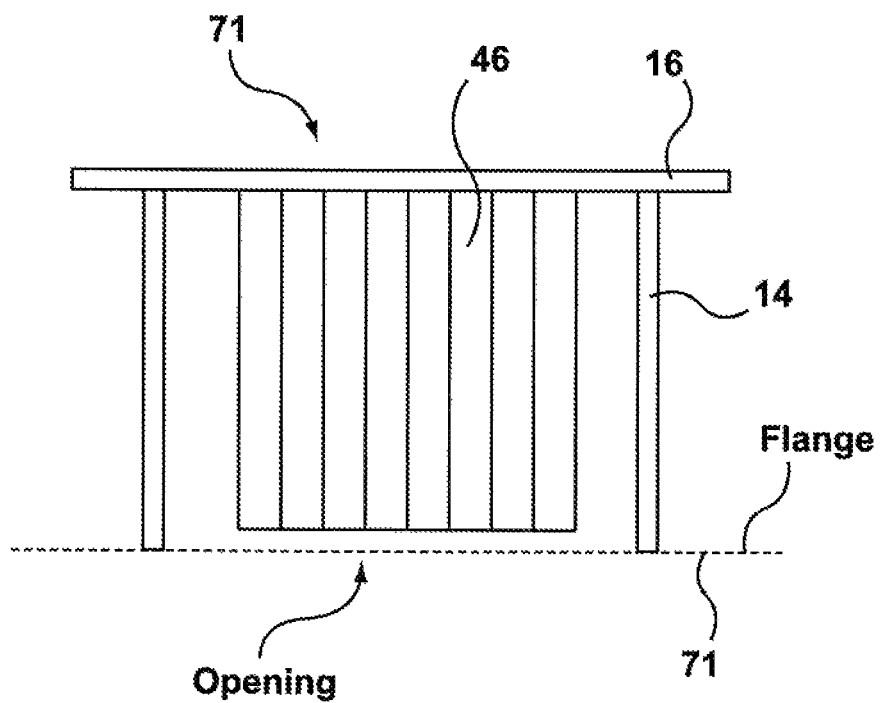
FIG. 19 is a further alternative embodiment of the insert shown in FIG. 18.

Referring to FIG. 19 is an alternative embodiment of the insert 70 for the existing roof vent 71 for ventilating a roof of a building via a hole in the roof to atmosphere, the existing roof vent 71 having a flange portion with an opening (shown in ghosted view) for connecting to a cap 16 via a frame portion 14, the flange portion for resting on the roof and having an opening for overlapping with the hole, the insert 70 comprising: a cap 16 for connecting to the frame portion 14 and covering over the opening; and a corrugated filter plate 46 connected to the cap 16 and for extending between the cap 16 and the flange portion and for interposing transversely between the opening and the atmosphere, the corrugated filter plate 46 providing for a passage of air between the atmosphere and the opening, the corrugated filter plate 46 having a pore size sufficient for facilitating the air passage of air through the corrugated filter plate 46 while blocking passage of atmospheric particles through the corrugated filter plate 46.

It is recognized that the corrugated filter plate 46 can also be referred to as a corrugated filter material 46 or corrugated filter structure 46. It is also recognized that the corrugated filter plate 46 can be provided as a replacement cartridge (to replace a damaged filter plate) for an existing roof vent (e.g. like those shown in FIGS. 17,18,19). The replacement cartridge can include the corrugated filter plate 46 as well as any of the components of the roof vent provided for in the FIGS. 1-19, as desired. For example, 22. the replacement cartridge for an existing roof vent for ventilating a roof of a building via a hole in the roof to atmosphere, the roof vent having a flange portion connected to a cap via a frame portion, the flange portion for resting on the roof and having an opening for overlapping with the hole. The replacement cartridge comprising a corrugated filter plate for connecting with at least one of the flange portion, the cap or the frame portion, the corrugated filter plate for extending between the cap and the flange portion and for interposing transversely between the opening and the atmosphere, the corrugated filter plate providing for a passage of air between the atmosphere and the opening, the corrugated filter plate having a pore size sufficient for facilitating the air passage of air through the corrugated filter plate while blocking passage of atmospheric particles through the corrugated filter plate.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

We claim:

1. An insert for a roof vent for ventilating a roof of a building via a hole in the roof to the atmosphere, the roof vent having a cap connected to a flange portion via a frame portion, the insert comprising:

a base of the flange portion, the base having a collar wall extending upwards from and transverse to the base; and a corrugated filter plate positioned on the base for extending between the cap and the flange portion and extending upwards and from the surface of the base, the corrugated filter plate of metal material having a corrugated surface providing for a passage of air between the atmosphere and the hole, the corrugated surface of the metal material simultaneously exposing a plurality of alternating folds as furrows and ridges to the passage of air, each of the plurality of folds comprising a fold line extending in a direction upwards and transverse from the base to the cap, each of the plurality of alternating folds having a plurality of individual pores as individual holes in the metal material spaced apart from one another on a respective surface of each of the plurality of folds, each of the individual holes having a pore size sufficient for the passage of air through the corrugated surface while blocking passage of atmospheric particles through the corrugated surface, each of the individual holes in the metal material for facilitating the passage of the air from one side of the metal material to the other side of the metal material; wherein the corrugated filter plate is surrounded by the collar wall and spaced apart from the collar wall and the base extends transverse to at least one side of the corrugated filter plate.

2. The insert of claim 1 further comprising the corrugated surface having a combined surface area to the passage of air greater than a corresponding planar cross-sectional area of a side of the insert, wherein summation of an effective open area of said each of the plurality of individual pores satisfies a minimum net open area threshold for the surface planar cross-sectional area.

3. The insert of claim 2 further comprising the shape of the corrugated filter plate adjacent to the hole as linear.

4. The insert of claim 2 further comprising the corrugated filter plate extending about a periphery of the hole.

5. The insert of claim 4 further comprising the corrugated filter plate as a plurality of sections about the periphery.

6. The inert of claim 1 further comprising the base extending transverse to the corrugated filter plate between the corrugated filter plate and the collar wall.

7. An insert for a roof vent for ventilating a roof of a building via a hole in the roof to the atmosphere, the roof vent having a flange portion for connecting to a cap via a frame portion, the flange portion for resting on the roof and having an opening for overlapping with the hole, the insert comprising:

the cap for connecting to the frame portion and covering over the opening by a surface; and a corrugated filter plate connected to the cap and for extending between the cap and the flange portion and extending downwards from the surface of the cap, the corrugated filter plate of metal material having a corrugated surface providing for a passage of air between the atmosphere and the hole, the corrugated surface of the metal material simultaneously exposing a plurality of alternating folds as furrows and ridges to the passage of air, each of the plurality of folds comprising a fold line extending in a direction downwards and transverse from the cap to the flange portion, each of the plurality of alternating folds having a plurality of individual pores as individual holes in the metal material spaced apart from one another on a respective surface of each of the plurality of folds, each of the individual holes having a pore size sufficient for the passage of air through the corrugated surface while blocking passage of atmospheric particles through the corrugated surface, each of the individual holes in the metal material for facilitating the passage of the air from one side of the metal material to the other side of the metal material; wherein the surface of the cap extends transversely to either side of the corrugated filter plate as well as across to cover one end of each of the plurality of alternating folds in order to inhibit the air from entering the one end as the one end is adjacent to the surface of the cap.

8. The insert of claim 7 further comprising the corrugated surface having a combined surface area to the passage of air greater than a corresponding planar cross-sectional area of a side of the insert, wherein summation of an effective open area of said each of the plurality of individual holes satisfies a minimum net open area threshold for the surface planar cross-sectional area.

9. The insert of claim 7 further comprising the shape of the corrugated filter plate adjacent to the hole as linear.

10. The insert of claim 7 further comprising the corrugated filter plate extending about a periphery of the hole.

11. The insert of claim 10 further comprising the corrugated filter plate as a plurality of sections about the periphery.

* * * * *